(12) United States Patent
Yoshioka (10) Patent No.: US 9,007,508 B2
(45) Date of Patent: Apr. 14, 2015

(54) PORTABLE DEVICE, PHOTOGRAPHING METHOD, AND PROGRAM FOR SETTING A TARGET REGION AND PERFORMING AN IMAGE CAPTURING OPERATION WHEN A TARGET IS DETECTED IN THE TARGET REGION

(71) Applicant: Sony Mobile Communications Inc., Minato-ku (JP)

(72) Inventor: Yasuhiro Yoshioka, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 13/746,782

(22) Filed: Jan. 22, 2013

(65) Prior Publication Data

US 2013/0258160 A1    Oct. 3, 2013

Related U.S. Application Data

(60) Provisional application No. 61/617,178, filed on Mar. 29, 2012.

(51) Int. Cl.
*H04N 5/222* (2006.01)
*H04N 5/232* (2006.01)

(52) U.S. Cl.
CPC ....... *H04N 5/23293* (2013.01); *H04N 5/23222* (2013.01)

(58) Field of Classification Search
CPC ................. H04N 5/23293; H04N 5/23296
USPC ............ 348/333.01–333.03, 333.11–333.12, 348/345–346, 349
See application file for complete search history.

(56) References Cited

U.S. PATENT DOCUMENTS

| | | | | |
|---|---|---|---|---|
| 8,237,807 | B2* | 8/2012 | Jones et al. | 348/221.1 |
| 8,670,060 | B2* | 3/2014 | Jones et al. | 348/333.01 |
| 2009/0015703 | A1* | 1/2009 | Kim et al. | 348/333.12 |
| 2009/0059058 | A1* | 3/2009 | Okabe et al. | 348/345 |
| 2009/0175509 | A1* | 7/2009 | Gonion et al. | 382/118 |
| 2010/0020221 | A1* | 1/2010 | Tupman et al. | 348/333.01 |
| 2010/0020222 | A1* | 1/2010 | Jones et al. | 348/333.02 |
| 2010/0165114 | A1* | 7/2010 | Goh | 348/169 |
| 2011/0032377 | A1* | 2/2011 | Kim et al. | 348/222.1 |
| 2011/0294545 | A1* | 12/2011 | Taira et al. | 455/556.1 |
| 2011/0317031 | A1* | 12/2011 | Honda | 348/229.1 |
| 2012/0120277 | A1* | 5/2012 | Tsai | 348/223.1 |

FOREIGN PATENT DOCUMENTS

JP    2009-171301    7/2009

* cited by examiner

*Primary Examiner* — Kelly L Jerabek
(74) *Attorney, Agent, or Firm* — Oblon, McClelland, Maier & Neustadt, L.L.P.

(57) ABSTRACT

An information processing apparatus that includes a camera unit that captures image data; a display unit that displays the image data captured by the camera unit; a control unit that sets a photographing target region specified at a desired position on a screen of the display unit, and instructs the camera unit to start photographing when a photographing target is detected in the photographing target region in the image data captured by the camera unit; and a memory unit that stores an image captured by the camera unit after the instruction to start photographing.

13 Claims, 8 Drawing Sheets

PORTABLE DEVICE, PHOTOGRAPHING METHOD, AND PROGRAM FOR SETTING A TARGET REGION AND PERFORMING AN IMAGE CAPTURING OPERATION WHEN A TARGET IS DETECTED IN THE TARGET REGION

CROSS REFERENCE TO RELATED APPLICATION

The present application claims the benefit of the earlier filing date of U.S. Provisional Patent Application Ser. No. 61/617,178 filed on Mar. 29, 2012, the entire contents of which is incorporated herein by reference.

BACKGROUND

1. Field of the Disclosure

This disclosure relates to a portable device having a camera function, such as a camera-equipped cellular phone terminal device, a photographing method, and a program.

2. Description of Related Art

In the case where an auto-focus (hereinafter, AF) function is operated in imaging devices that capture still images, such as cameras, a focus adjustment optimal for a subject is performed. After that, an AF locking operation for maintaining an AF completion state is performed. In addition, in imaging devices of this type, an auto-exposure (hereinafter, AE) function as well as the AF function is operated, and exposure adjustment is performed by adjusting the diaphragm and shutter speed to achieve an exposure that exhibits an optimal brightness of a subject image. After that, an AE locking operation for maintaining an AE completion state is performed.

In the case of general film cameras or digital still cameras, an AF function is operated in response to a half-press of a shutter button performed when a user intends to capture an image. To achieve AF/AE locking, a half-pressed state of the shutter button leads to AF/AE locking and the AF/AE locking is maintained. After AF/AE locking is performed, when a user performs a specific operation, AF/AE locking is released.

For example, an imaging device (portable terminal) that includes a subject state detector for detecting the state of a subject and that releases a fixed state in the case where a change in the state of a subject is detected in accordance with the result of detection performed by the subject state detector after the focus is fixed under an auto-focus function, is disclosed (see, for example, Japanese Unexamined Patent Application Publication No. 2009-171301).

SUMMARY

The subject state detector described in Japanese Unexamined Patent Application Publication No. 2009-171301 performs face detection in a subject image to obtain the position of a face region. The function controller releases the AF fixed state when the obtained position of the face region changes a specific amount or more.

For example, in the case of single AF for bringing a subject into focus, locking works when an in-focus state is achieved, and the in-focus state is maintained. Thus, when the subject is moved, the subject falls out of focus.

Furthermore, in the case where continuous AF (auto-focus mechanism) is used, a moving subject is continuously in focus while a shutter button is half-pressed. Thus, it requires a long time to achieve AF in a specified region or it is difficult to bring the subject in the specified region into focus.

The inventor recognizes the necessity to reliably photograph a desired subject at a position desired by a user in a captured image.

According to an embodiment of this disclosure, there is provided an information processing apparatus that includes a camera unit that captures image data; a display unit that displays the image data captured by the camera unit; a control unit that sets a photographing target region specified at a desired position on a screen of the display unit, and instructs the camera unit to start photographing when a photographing target is detected in the photographing target region in the image data captured by the camera unit; and a memory unit that stores an image captured by the camera unit after the instruction to start photographing.

According to an embodiment of this disclosure, a photographing target region may be specified at a desired position on a screen on the basis of a user operation. When a photographing target is detected in the photographing target region, photographing is started. Thus, a photographing target can be photographed at a desired position.

According to at least one embodiment of this disclosure, a desired subject can be reliably photographed at a position desired by a user in a captured image.

DETAILED DESCRIPTION

Hereinafter, examples of embodiments of this disclosure will be explained with reference to the attached drawings. Explanation will be made in the order mentioned below. Note that components that are in common among the drawings will be referred to with the same reference signs and redundant explanation will be omitted.

1. Embodiment (example in which photographing start target region is specified)
 1.1 Processing when terminal is moved
 1.2 Processing when zooming is performed
 1.3 Processing when a plurality of photographing start target regions are set
 1.4 Example of photographing target
2. Others (Modifications)

<1. Embodiment>

An example in which a portable device according to an embodiment of this disclosure is applied to a cellular phone terminal device will be explained as an example.

(Example of Internal Configuration of Cellular Phone Terminal Device)

Figure 1:
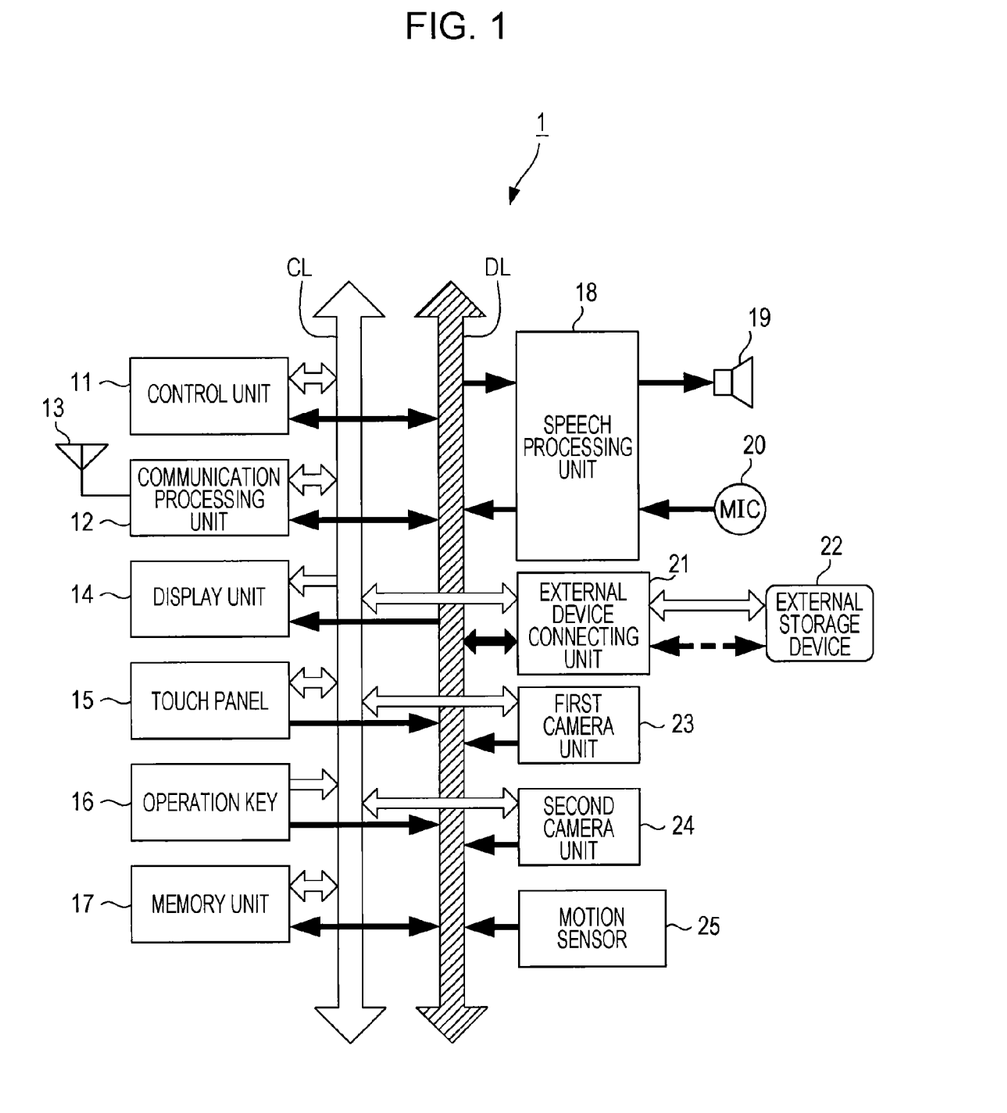
FIG. 1 is a block diagram illustrating an example of the schematic internal configuration of a cellular phone terminal device according to an embodiment of this disclosure.

FIG. 1 is a block diagram illustrating an example of the schematic internal configuration of a cellular phone terminal device according to an embodiment of this disclosure.

In FIG. 1, a communication processing unit 12 is a wireless communication circuit used when a cellular phone terminal device 1 communicates with a wireless base station of a cellular phone network. The communication processing unit 12 performs frequency conversion, modulation, demodulation, and the like of transmission signals and reception signals. An antenna 13 is, for example, an internal antenna, and performs transmission and reception of electric waves when the cellular phone terminal device 1 wirelessly communicates with the wireless base station.

A display unit 14 includes a display device, such as, for example, a liquid crystal display or an organic EL (ElectroLuminescent) display, and a display driving circuit for the display device. The display unit 14 displays, in accordance with an image signal supplied from a control unit 11, a wallpaper image, an incoming call image, various menu images, web browsing images, various characters of electronic mail and the like, images captured by a camera unit, and the like on the display device. The display unit 14 is used as a view-finder when a camera function is working. For example, a view-finder for a first camera unit 23 and a view-finder for a second camera unit 24 may be provided.

A touch panel 15 is an example of an operator. When a finger or a dedicated pen (generally referred to as an "indicator") touches the screen (detection surface), the touch panel 15 detects the position where the indicator touches. Then, the touch panel 15 performs AD (analog-digital) conversion of an electric signal detected in accordance with the position where the indicator touches, and supplies the converted signal to the control unit 11 as positional information on the screen where the indicator touches. For example, for various input operations or setting operations to be performed, displaying for performing an operation or guiding an operation is performed on the display unit 14. A user performs operations on the screen of the touch panel 15 in accordance with the display to perform corresponding input or setting processing. Note that, although a detection method performed by the touch panel 15 may be a piezoelectric method, an electrostatic method, or the like, the detection method performed by the touch panel 15 is not limited to any of the detection methods mentioned above.

An operation key 16 includes operators that include keys, such as a numeric keypad, a call start key, and a call end/power key, and a cross key, arranged on the casing, which is not illustrated, of the cellular phone terminal device 1 of this embodiment, and an operation signal generator that generates operation signals when operations are performed on the above-mentioned operators.

A memory unit 17 includes, for example, an internal memory (not illustrated) provided inside the terminal and a removable card-like memory (not illustrated) that stores so-called SIM (Subscriber Identity Module) information and the like. The internal memory includes a ROM (Read Only Memory) and a RAM (Random Access Memory). The ROM includes a NAND-type or NOR-type flash memory or a rewritable ROM, such as an EEPROM (Electrically Erasable Programmable Read-Only Memory). For example, an OS (Operating System) program, a control program used by the control unit 11 to control individual units, various application programs, various initial setting values, and the like are stored in the ROM.

Furthermore, a storage area for various setting data used when a photographing program according to this embodiment is executed, still image data, moving image data, and the like is arranged in the internal memory. Furthermore, in addition to the above, data of a telephone directory and an electronic mail address book, data of a personal organizer, and the like are stored in the internal memory. Data is stored, wherever necessary, in the RAM serving as a work area used when the control unit 11 performs various types of data processing.

A speech processing unit 18 is a processing unit that performs processing relating to reproduction and recording of speech signals. A speaker 19 and a microphone 20 are connected to the speech processing unit 18. The speech processing unit 18 demodulates a speech signal supplied from the control unit 11, performs processing such as amplification, and supplies the processed speech signal to the speaker 19. The speech processing unit 18 also modulates a speech signal supplied from the microphone 20, and supplies the modulated speech signal to the control unit 11.

The speaker 19 includes a speaker for reception provided on the cellular phone terminal device 1 and a speaker for outputting a ringer (ringtone), alarm sound, played music, and the like. The speaker 19 converts a speech signal supplied from the speech processing unit 18 into acoustic waves, and outputs the acoustic waves to the air. The microphone 20 is a microphone for transmission and collection of external sound. The microphone 20 converts acoustic waves into a speech signal, and transmits the speech signal to the speech processing unit 18.

An external device connecting unit 21 is an interface used for transmission and reception of signals or data between an external storage device 22, which is installed into an external connecter (not illustrated), and the control unit 11. Image data captured by a camera unit may be stored in the external storage device 22. Furthermore, a photographing program according to this embodiment may be stored in the external storage device 22.

The first camera unit 23 is a camera unit that is provided, for example, on an exposure surface side of the casing (the surface side opposite the surface on which a main display unit is arranged or opposite the surface that faces a user in ordinary use). For example, the first camera unit 23 includes an imaging element, such as a CMOS image sensor (CMOS: Complementary Metal Oxide Semiconductor) or a CCD image sensor (CCD: Charge Coupled Device), an optical system, an imaging device (signal processing circuit), and the like.

The imaging element, such as a CMOS image sensor or a CCD image sensor, includes many lines in a line direction (=vertical direction), each of the lines including many pixels aligned in a row direction (=horizontal direction). Electric charge corresponding to imaging light of a subject is stored in pixels in the individual lines, and the electric charge stored in the pixels of the individual lines is output as image data when reading is performed. The first camera unit 23 including such an imaging element is mainly used when a desired subject other than a user is photographed.

The second camera unit 24 is a camera unit that is provided, for example, on the non-exposure surface side of the casing (the surface side on which the main display unit is arranged or the surface side that faces a user in ordinary use), and includes an imaging element, an optical system, an imaging device (signal processing circuit), and the like. The second camera unit 24 is mainly used as a camera unit for photographing the user of the cellular phone terminal device 1, so-called self-photographing, when a videophone call is in progress. The first camera unit 23 and the second camera unit 24 are capable of capturing moving images as well as still images.

The first camera unit 23 is also called an out-camera, a rear camera, or a back camera. The second camera unit 24 is also called an in-camera, a chat camera, or a front camera.

A motion sensor 25 is configured to include an acceleration sensor and a gyro sensor. For example, when a physical vibration is applied to the cellular phone terminal device 1, the acceleration sensor detects the magnitude and direction of the acceleration of the vibration. When a physical vibration is applied to the cellular phone terminal device 1, the gyro sensor detects the angular velocity in the rotation direction and rotation angle caused by the vibration. With the use of these sensors, the motion sensor 25 detects the external force applied to the cellular phone terminal device 1 due to the vibration caused when the cellular phone terminal device 1 moves. The motion sensor 25 transmits an output signal corresponding to the detected external force to the control unit 11.

The control unit 11 executes various control programs and application programs stored in the memory unit 17 and performs various types of data processing involved in the execution of the programs. Accordingly, the control unit 11 performs, for example, communication control, imaging control, audio processing control, and image processing control for the first camera unit 23 and the second camera unit 24 on the basis of the photographing program, various types of signal processing, control for individual units, and the like. For example, an arithmetic processing device, such as a microprocessor or a CPU (central processing unit), is applied to the control unit 11.

In addition, although not illustrated in FIG. 1, it should be understood that the cellular phone terminal device 1 according to this embodiment obviously includes various components that are provided in a general cellular phone terminal device. Note that in this embodiment, a GPS unit is also provided that detects the current position and the like using satellite electric waves of a GPS (Global Positioning System).

Transmission and reception of various signals or data transmission between the individual functional blocks in FIG. 1 is performed via a control line CL and a data line DL in an appropriate manner. However, in the explanation given below, description of the control line CL and the data line DL will be omitted.

(Functional Block of Control Unit 11)

Figure 2:
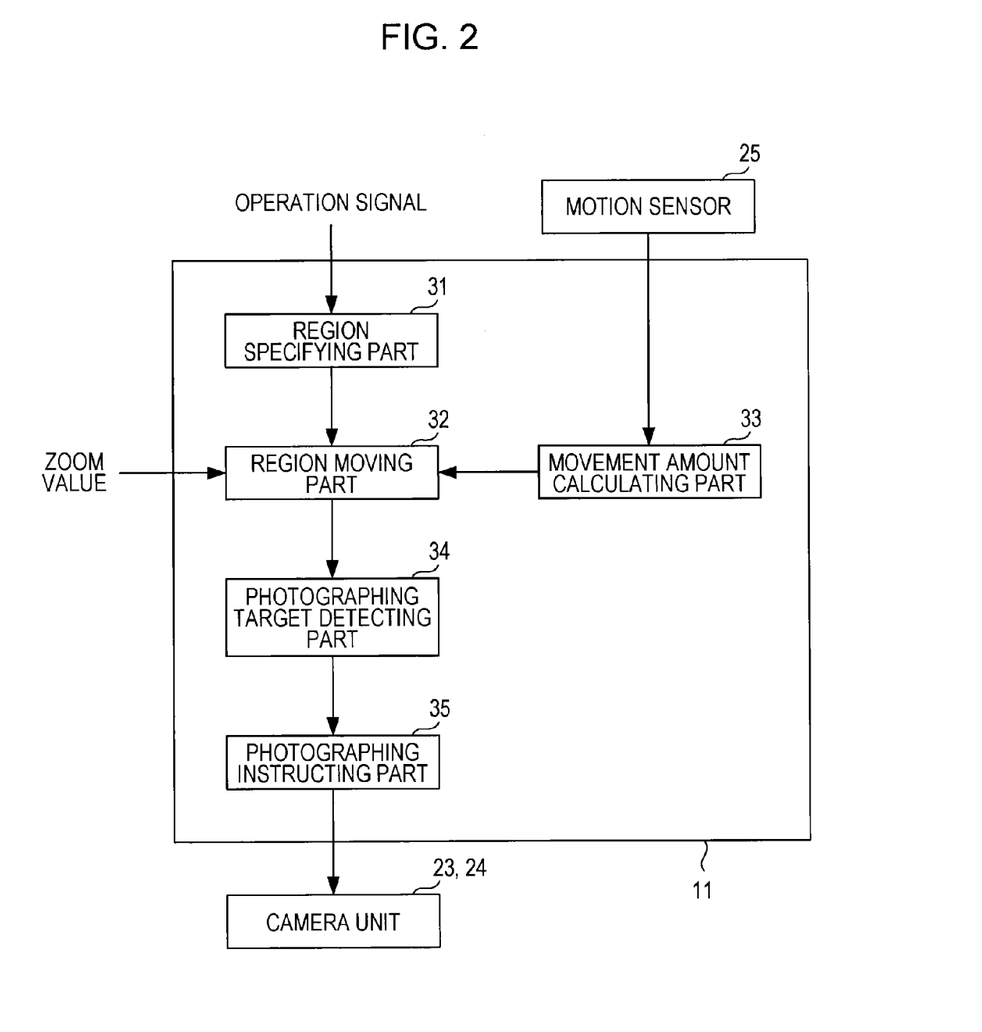
FIG. 2 is a functional block diagram schematically expressing individual pieces of processing performed by a control unit by execution of a photographing program.

FIG. 2 is a functional block diagram schematically illustrating individual pieces of processing performed by the control unit 11 in accordance with the execution of a photographing program according to this embodiment.

For example, in the case where a camera-through image (draft image or a live view image) is displayed on the display unit 14, the photographing program according to this embodiment is executed while specifying a photographing start target region. A method for forming a camera-through image is as described below, for example.

Camera-through images are images that are captured by imaging elements of the individual camera units and are sequentially displayed on the display unit 14 without being stored in the memory unit. For example, decimation processing is performed when image data is read from an imaging element, so that a captured image having an image size smaller than the image size corresponding to the total number of pixels of the imaging element, that is, a camera-through image, can be formed. Hereinafter, a screen of the display unit 14 on which a camera-through image is displayed may be called a camera-through screen.

Referring back to FIG. 2, the control unit 11 is configured to include a region specifying part 31, a region moving part 32, a movement amount calculating part 33, a photographing target detecting part 34, and a photographing instructing part 35.

The region specifying part 31 displays a photographing start target region (frame) on the screen (camera-through screen) on which a camera-through image is displayed, and determines the position and size of the photographing start target region on the basis of an operation signal output from an operator (the touch panel 15 or an operation key) in accordance with a user operation. After the position and size of the photographing start target region are specified, the display of the frame indicating the photographing start target region may be deleted or the display of the frame may be left for a user.

For example, for the case where a photographing start target region is a rectangular frame, the point of intersection of diagonal lines or the center of gravity of the rectangular frame is used for the position of the photographing start target region. For the case where a photographing start target region is a circular frame, the center of the circular frame is used for the position of the photographing start target region. The size of a photographing start target region can be changed, using the point of intersection or the center of gravity of a rectangular frame or the center of a circular frame as a reference point, while similarity is maintained.

Various shapes, such as a star shape, a shape bordered by a user in a desired manner using the touch panel 15, and the like, as well as a rectangular shape and a circular shape may be applied to the shape of the frame indicating a photographing start target region. Hereinafter, an example of a rectangular shape will be explained.

The region moving part 32 calculates the movement amount (the number of pixels) and moving direction of a photographing start target region with respect to the screen of the display unit 14, in accordance with the movement amount, the moving direction, and the zoom value of the cellular phone terminal device 1 supplied from the movement amount calculating part 33. In the case where the cellular phone terminal device 1 is moved or there is a change in the zoom value after a photographing start target region is specified by a user, the region moving part 32 changes the position and/or size of the specified photographing start target region and displays the changed photographing start target region on the display unit 14. That is, the region moving part 32 has a function of following the movement of the cellular phone terminal device 1 on the screen.

The movement amount calculating part 33 obtains the operation status of the cellular phone terminal device 1 on the basis of an output signal supplied from the motion sensor 25. That is, the movement amount calculating part 33 analyzes the external force applied to the cellular phone terminal device 1 on the basis of an output signal supplied from the motion sensor 25, and calculates the movement amount and moving direction of the cellular phone terminal device 1 on the basis of the result of the analysis. For example, first, the movement amount calculating part 33 calculates the moving speed from the acceleration of a vibration or the angular velocity in the rotation direction of the vibration supplied from the motion sensor 25 for a certain section. Then, the movement amount calculating part 33 calculates the integral of moving speed values to obtain the moving distance by the integrated value. Accordingly, the movement amount calculating part 33 calculates the physical amount the cellular phone terminal device 1 is actually moved by a user operation or the like.

The photographing target detecting part 34 determines whether or not a desired or specific photographing target has been detected within a specified photographing start target region (frame), and transmits the result of the determination to the photographing instructing part 35. Since processing for detecting a desired or specific photographing target passing through a specified photographing start target region or existing in a specified region can be implemented using a known technique, a detailed explanation of the processing will be omitted here.

For example, the photographing target detecting part 34 continuously compares an image of a photographing start target region in a camera-through image with a reference image including a specific photographing target. In the case where a correlation value in the photographing start target region is equal to or greater than a certain value, it is determined that a correlation exists, that is, the specific photographing target enters the photographing start target region. Alternatively, the photographing target detecting part 34 is capable of determining that a desired photographing target is passing through the photographing start target region by detecting a motion vector of the image of the photographing start target region.

Furthermore, for example, as described in FIGS. 3 and 4 of Japanese Unexamined Patent Application Publication No. 2009-171301, a face region of a person (corresponding to a specific photographing target) in a subject image can be detected using a known face detection technique.

Upon receiving a detection result indicating that a photographing target has been detected in a specified photographing start target region from the photographing target detecting part 34, the photographing instructing part 35 instructs the first camera unit 23 or the second camera unit 24 to start photographing.

Upon receiving the instruction for start of photographing from the photographing instructing part 35, the camera unit (the first camera unit 23 or the second camera unit 24) releases the shutter to start capturing of a camera-through image. The captured image is recorded in the memory unit 17 or the external storage device 22.

The example in which a camera-through image is displayed on the display unit 14 in the execution of a photographing program according to this embodiment has been given. However, a camera-through image is not necessarily displayed. For example, a photographing start target region may be determined on the basis of a user operation for a setting screen on which a camera-through image is not displayed, and the photographing program may be executed.

(Example of Operation of Cellular Phone Terminal Device)

Figure 3:
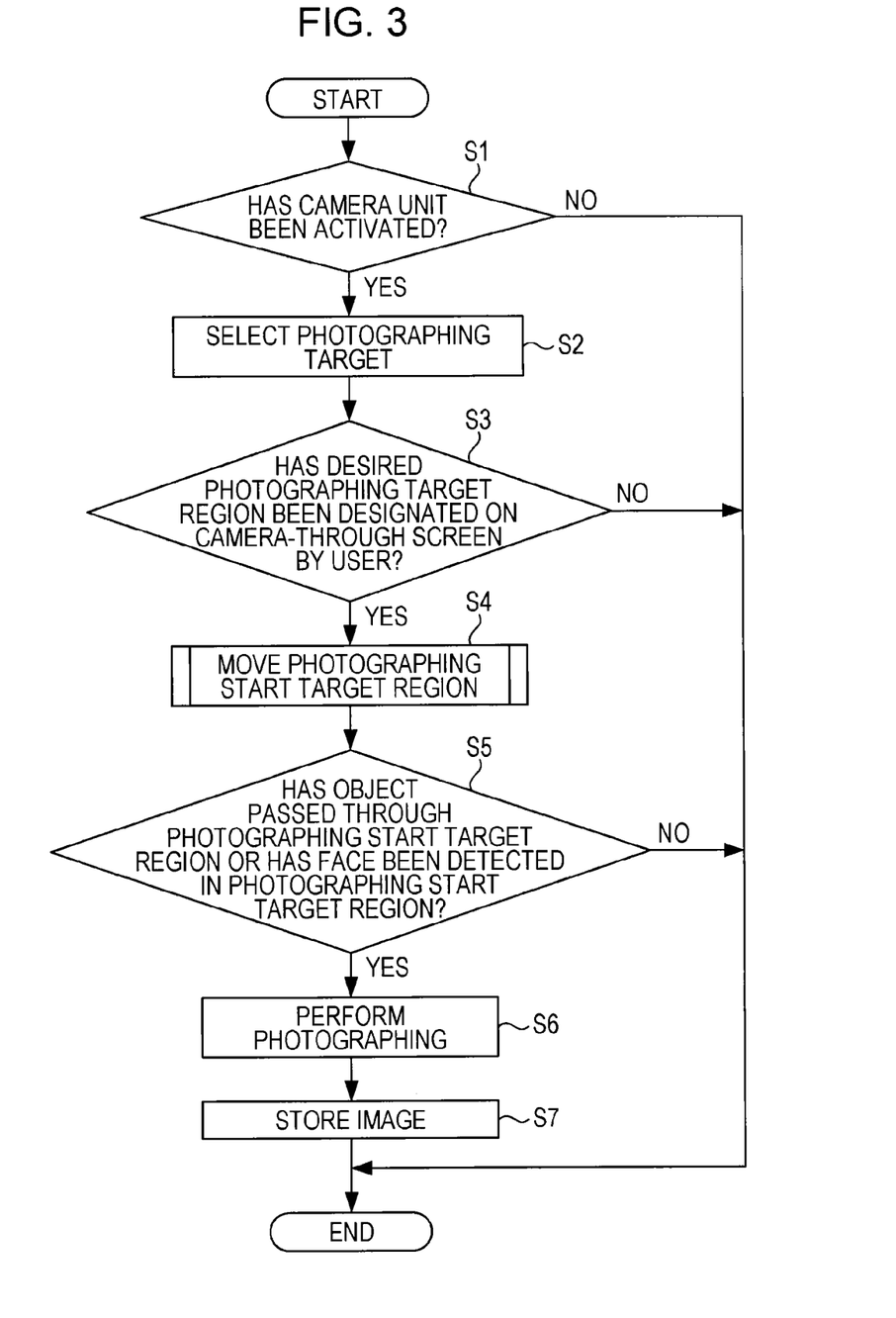
FIG. 3 is a flowchart illustrating an example of an operation of a cellular phone terminal device according to an embodiment of this disclosure.

FIG. 3 is a flowchart illustrating an example of an operation of the cellular phone terminal device 1 according to an embodiment of this disclosure.

First, the control unit 11 determines whether the camera function (the first camera unit 23 or the second camera unit 24) has been activated (step S1). In the case where the camera function has not been activated, the process is terminated.

In the case where the camera has been activated, the control unit 11 displays a menu screen that allows selection of a photographing target on the display unit 14, and determines a photographing target on the basis of a user operation (step S2). The photographing target selected by the user is stored into the RAM of the memory unit 17. Various examples, such as a subject photographed by the first camera unit 23 or the second camera unit 24, the face of a person registered in a telephone directory, and the like, may serve as photographing targets.

Next, the region specifying part 31 of the control unit 11 displays the frame of a photographing start target region on the camera-through screen, and allows the user to specify the position and size of the photographing start target region on the camera-through screen in a desired manner (step S3). Accordingly, the user specifies a desired photographing region on the camera-through screen using an operator. The region specifying part 31 stores the position and size of the photographing start target region specified by the user into the RAM of the memory unit 17. In the case where specification of the position and size of a photographing start target region has not been performed by the user, the process is terminated.

In the case where the display content of the camera-through screen is changed (the camera-through image is moved) in accordance with movement of the cellular phone terminal device 1 or there is a change in the zoom value after the position and size of the photographing start target region are specified by the user, processing for moving the specified photographing start target region is performed (step S4). That is, the position and/or size of the photographing start target region are changed or fixed in an appropriate manner, and the photographing start target region is displayed on the display unit 14.

Figure 4:
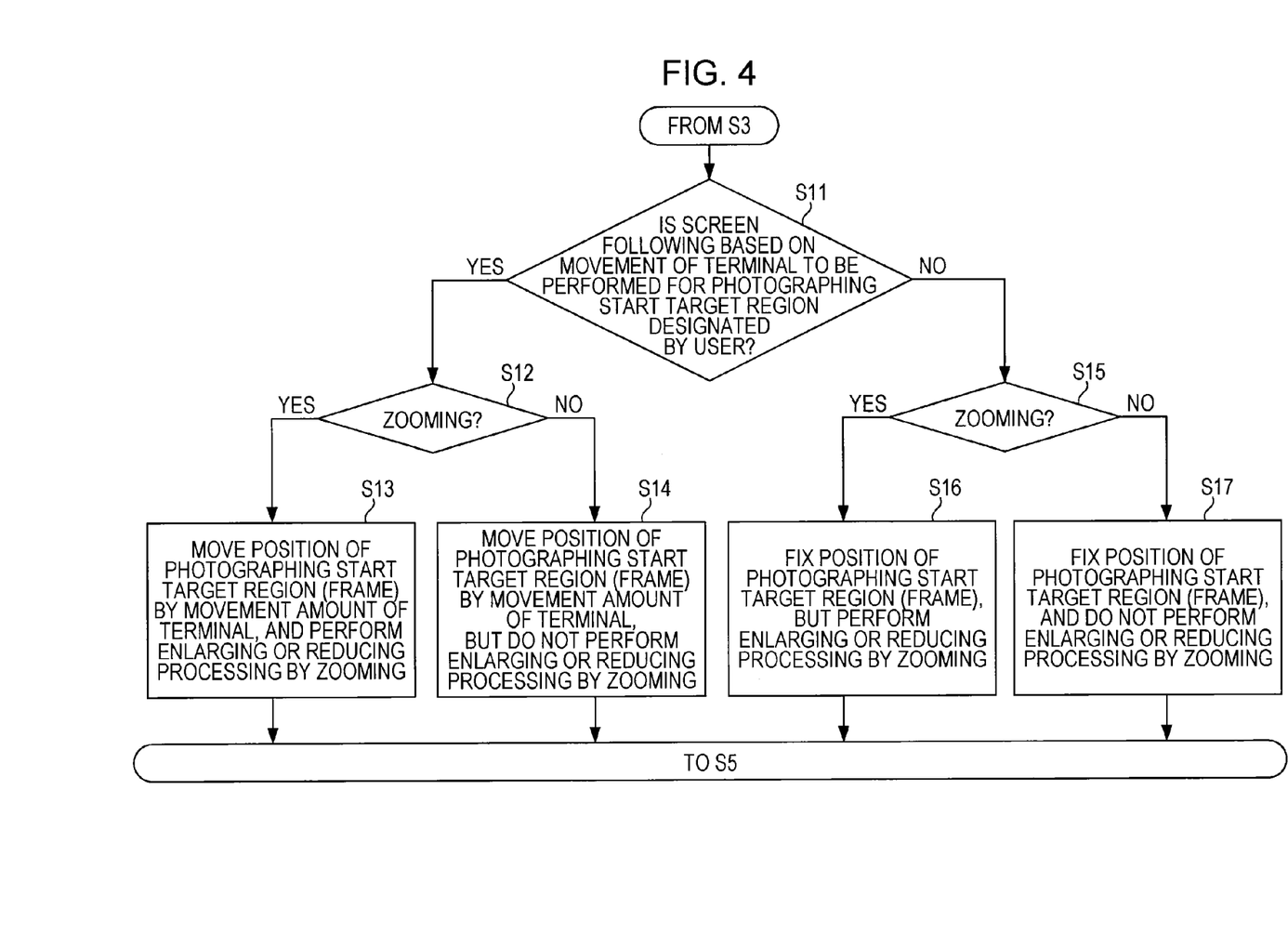
FIG. 4 is a flowchart illustrating processing for moving a photographing start target region illustrated in FIG. 3 (step S4).

Here, processing for moving a photographing start target region by the region moving part 32 will be specifically explained with reference to a flowchart illustrated in FIG. 4.

First, the region moving part 32 determines whether screen following based on the movement of the cellular phone terminal device 1 is to be performed for the photographing start target region specified by the user (step S11). The determination as to whether or not screen following is to be performed may be set in advance and, for example, setting information may be registered in the ROM of the memory unit 17. Alternatively, a setting menu may be displayed on the screen so that the user can perform setting.

In the case where screen following based on the movement of the cellular phone terminal device 1 is to be performed (YES in step S11), the region moving part 32 determines whether or not to perform zooming (step S12).

In the case where it is determined in the determining processing of step S12 that zooming is to be performed (YES in step S12), the region moving part 32 moves the photographing start target region (frame) on the camera-through screen on the basis of the movement amount of the cellular phone terminal device 1 calculated by the movement amount calculating part 33. Furthermore, enlargement/reduction of the photographing start target region (frame) is performed while reflecting the zoom value (step S13).

In the case where it is determined in the determining processing of step S12 that zooming is not to be performed (NO in step S12), the region moving part 32 moves the photographing start target region (frame) on the camera-through screen on the basis of the movement amount of the cellular phone terminal device 1 calculated by the movement amount calculating part 33. However, enlargement/reduction of the photographing start target region reflecting the zoom value is not performed (step S14).

In contrast, in the case where screen following based on the movement of the cellular phone terminal device 1 is not to be performed (NO in step S11), the region moving part 32 determines whether or not to perform zooming (step S15).

In the case where it is determined in the determining processing of step S15 that zooming is to be performed (YES in step S15), the region moving part 32 does not move the photographing start target region (frame) on the camera-through screen. However, enlargement/reduction of the photographing start target region (frame) is performed while reflecting the zoom value (step S16).

In the case where it is determined in the determining processing of step S15 that zooming is not to be performed (NO in step S15), the region moving part 32 does not move the photographing start target region (frame) on the camera-through screen. Furthermore, enlargement/reduction of the photographing start target region (frame) reflecting the zoom value is not performed (step S17).

In the case where the cellular phone terminal device 1 is moved after a photographing start target region is specified by a user, the display content of the camera-through screen is changed (the camera-through image is moved). By the region moving part 32 performing the processing described above, the relative positional relationship between the originally specified photographing start target region and the camera-through image can be maintained or, on the contrary, the positional relationship between the original screen of the display unit 14 when the photographing start target region is specified and the photographing start target region can be fixed.

After the above-described processing of steps S13 to S17 is completed, the process proceeds to the processing of step S5.

Referring back to the explanation of FIG. 3, after the processing of step S4 for moving the photographing start target region is completed, the photographing target detecting part 34 determines whether or not a desired photographing target (for example, a certain object) has passed through the specified photographing start target region. Alternatively, the photographing target detecting part 34 determines whether or not a specific photographing target (for example, the face of a person) has been detected (step S5). In the case where a desired or specific photographing target has not been detected in the photographing start target region, the process is terminated.

In the case where a certain photographing target has been detected in the specified photographing start target region, the photographing instructing part 35 instructs the camera unit (the first camera unit 23 or the second camera unit 24) to start photographing (step S6).

The camera unit (the first camera unit 23 or the second camera unit 24) stores a captured image, that is, an image captured by the imaging element into the internal memory of the memory unit 17 (step S7). After the processing of step S7 is completed, a series of processing are terminated.

With the above-described processing, a user is able to select a desired photographing target region on the display screen and to reliably photograph a desired subject at a position desired by the user.

[1.1 Processing when Terminal is Moved]

Next, the relationship between a photographing start target region and movement of a cellular phone terminal device will be specifically explained.

Here, in the case where the cellular phone terminal device 1 is moved vertically, horizontally, and the like, two cases are supported for movement of a photographing start target region specified by a user in accordance with user's selection (setting).

Figure 5:
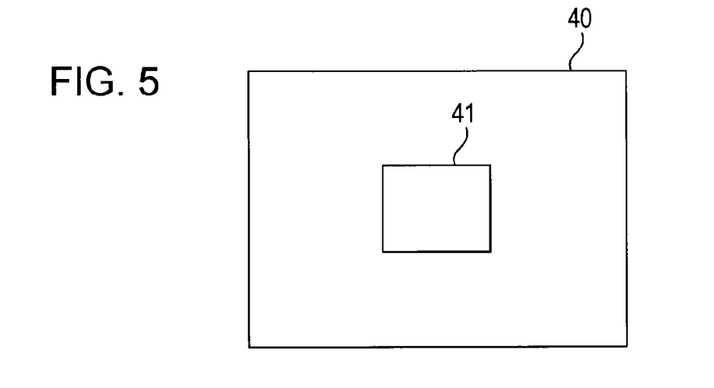
FIG. 5 illustrates a display example of a screen on which a photographing start target region is fixed and displayed when a cellular phone terminal device is moved.

In a first case, as illustrated in FIG. 5, even if a subject image on a screen 40 of the display unit 14 is moved by movement of the cellular phone terminal device 1, the position of a photographing start target region 41 specified by a user with respect to the screen 40 is fixed. That is, the relative positional relationship between the photographing start target region and the subject changes.

Figure 6A:
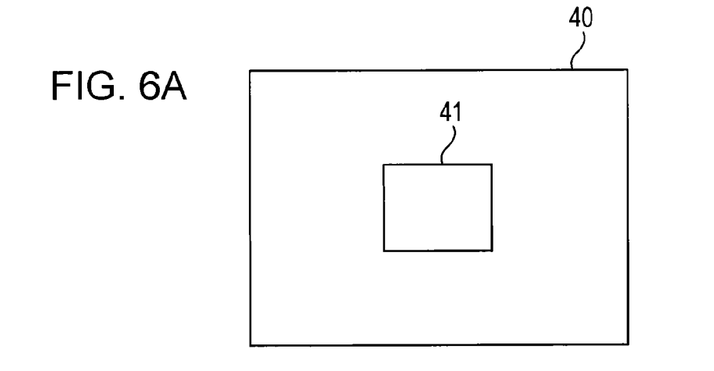
FIG. 6A is a display example of a screen on which a photographing start target region before a cellular phone terminal device is moved is displayed.
Figure 6B:
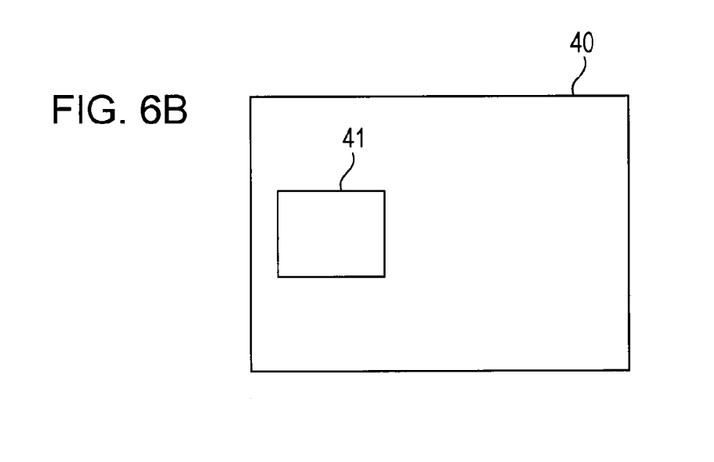
FIG. 6B is a display example of a screen on which a photographing start target region after the cellular phone terminal device is moved is displayed.

In a second case, when a subject image on the screen 40 of the display unit 14 is moved by movement of the cellular phone terminal device 1, the photographing start target region 41 is moved from a position at the center of the screen 40 before movement (FIG. 6A) to a position in a left portion of the screen 40 after movement (FIG. 6B). That is, the relative positional relationship between the photographing start target region and the subject does not change.

As described above, for the movement amount of a photographing start target region, the motion sensor 25 (the acceleration sensor and the gyro sensor) built in the cellular phone terminal device 1 is used. When zooming is not performed (fixed at a magnification of 1.0×), the movement amount the cellular phone terminal device 1 is moved is directly used as the movement amount of the position of the photographing start target region (the number of pixels×the size of one pixel).

In the case where zooming is performed as described below, the movement amount is multiplied by the multiplying factor. That is, the following calculation is used:

Movement amount of photographing start target region =(movement amount of cellular phone terminal device)×(zoom factor)

Note that if the photographing start target region deviates from the screen of the display unit, that is, completely moved out of the screen, the photographing start target region may be deleted.

[1.2 Processing when Zooming is Performed]

Next, the relationship between a photographing start target region and zooming will be specifically explained.

Here, in the case where the camera unit performs zooming, two cases are supported for enlargement or reduction of a photographing start target region specified by a user in accordance with user's selection (setting).

Figure 7:
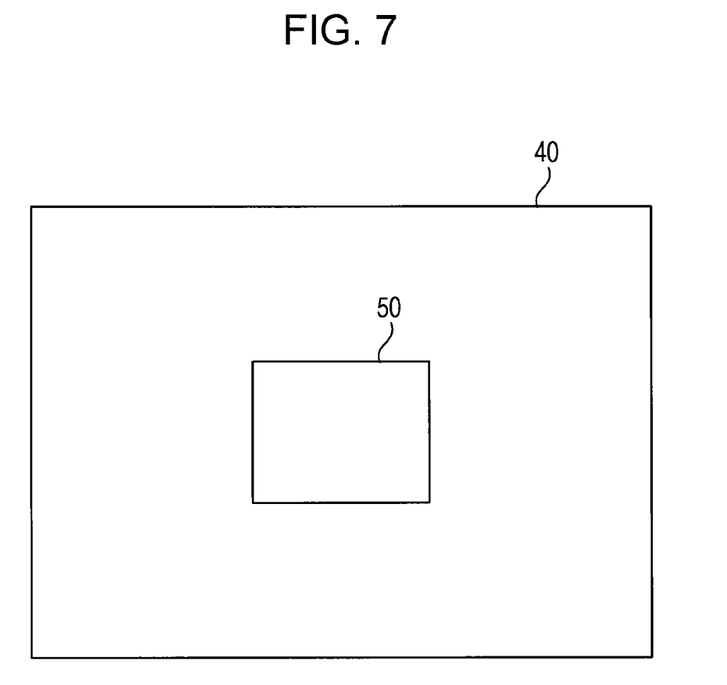
FIG. 7 is a display example of a screen on which a photographing start target region is fixed and displayed when zooming is performed.

In a first case, as illustrated in FIG. 7, even when the camera unit performs zooming, the size of a photographing start target region 50 specified by a user with respect to the screen 40 is fixed. That is, the relative size relationship between the photographing start target region and a subject changes. Even when enlargement or reduction is performed using digital zooming or optical zooming on the screen (view-finder) of the display unit 14, the photographing start target region is fixed.

In the first case, the user is able to wait for the photographing target entering the photographing start target region without caring about enlargement or reduction of the specified photographing start target region.

In a second case, when the camera unit performs zooming, the size of the photographing start target region 50 specified by the user with respect to the screen 40 is enlarged or reduced at the same time.

Figure 8A:
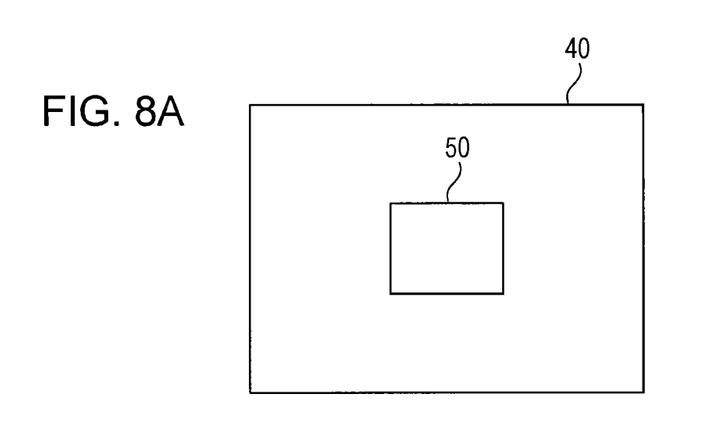
FIG. 8A is a display example of a screen on which a photographing start target region when zooming is not performed (normal) is displayed.
Figure 8B:
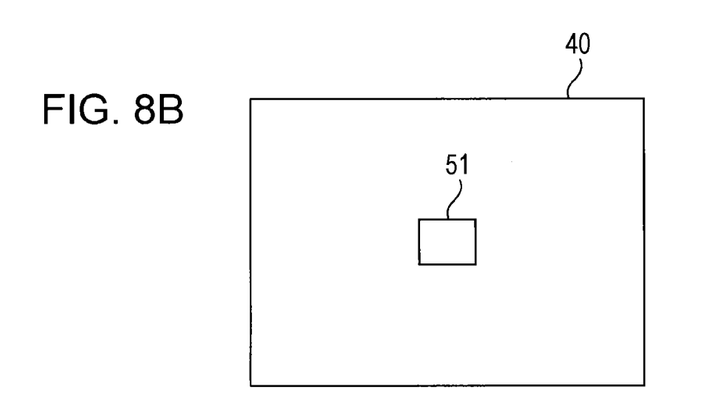
FIG. 8B is a display example of a screen on which a photographing start target region after the zoom is changed (reduction) is displayed.
Figure 8C:
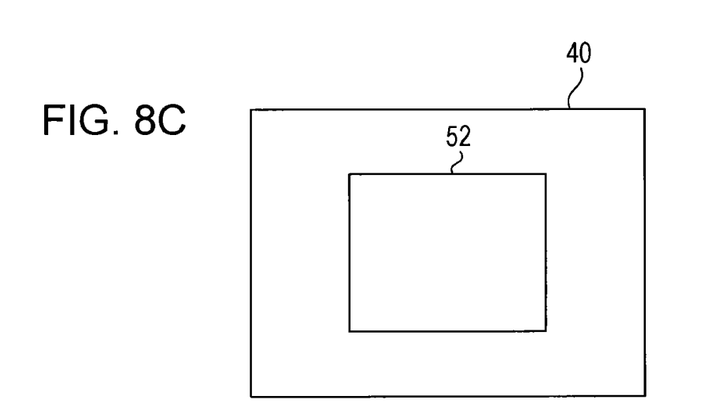
FIG. 8C is a display example of a screen on which a photographing start target region after the zoom is changed (enlargement) is displayed.

In the second case, when zooming is performed, the photographing start target region 50 specified by the user is also enlarged (FIG. 8C: photographing start target region 51) or reduced (FIG. 8B: photographing start target region 52) in accordance with the zoom ratio (zoom value). Accordingly, the size of the photographing start target region can be changed to a size that reflects enlargement and reduction of the photographing target caused by zooming. In the case where zooming is not performed, the photographing start target region 50 keeps the normal size (FIG. 8A).

[1.3 Processing when a Plurality of Photographing Start Target Regions are Set]

Next, processing performed when a plurality of photographing start target regions are set will be explained.

Figure 9:
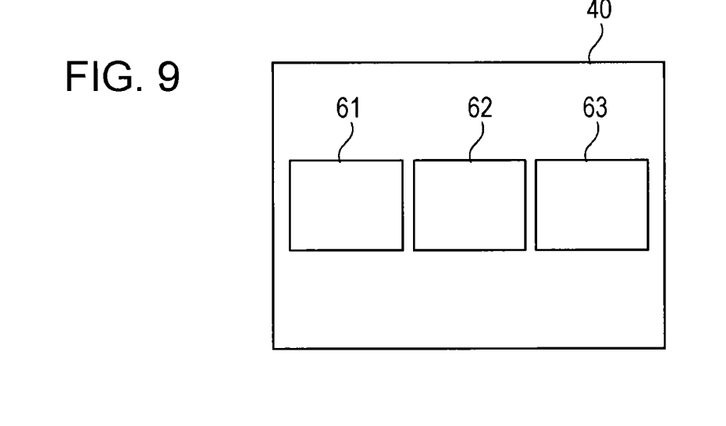
FIG. 9 is a display example of a screen on which an example of a plurality of photographing start target regions is displayed.

Here, as illustrated in FIG. 9, in the case where a user specifies a plurality of photographing start target regions 61 to 63 on the screen 40, two cases are supported in accordance with user's selection (setting).

Figure 10A:
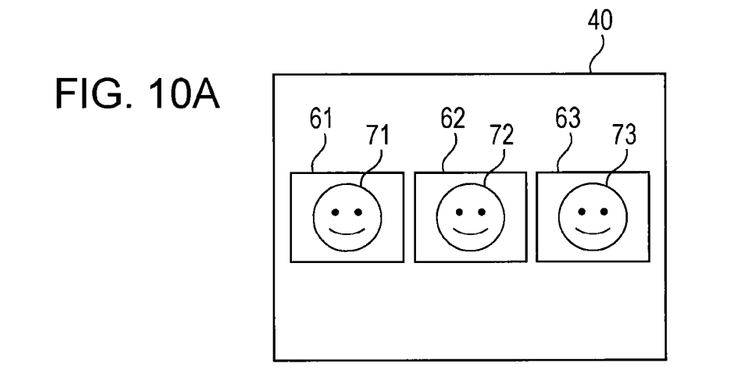
FIG. 10A is a display example of a screen on which photographing targets have been detected in all the plurality of photographing start target regions.

In a first case, as illustrated in FIG. 10A, if individual photographing targets 71 to 73 are not recognized in the specified plurality of photographing start target regions 61 to 63 at the same time (hereinafter, simultaneous multiple recognition), photographing is not performed.

Accordingly, in a group photograph or the like in which a plurality of photographing targets may exist, a plurality of photographing start target regions are specified and simultaneous multiple recognition can be defined as photographing conditions.

Figure 10B:
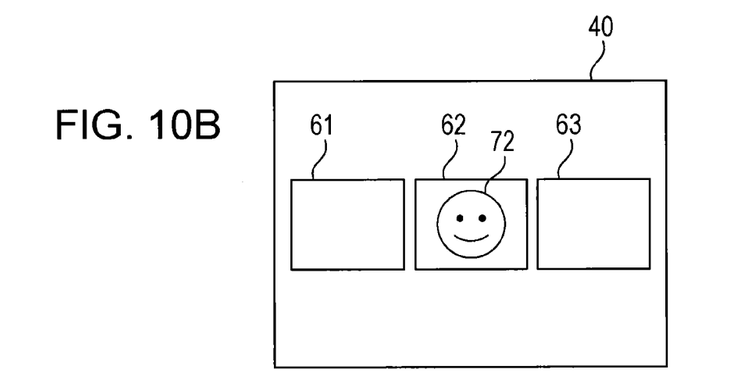
FIG. 10B is a display example of a screen on which a photographing target has been detected in at least one of the plurality of photographing start target regions.

In a second case, as illustrated in FIG. 10B, when a photographing target is recognized in any one of the specified plurality of photographing start target regions 61 to 63, photographing is performed.

In the configuration described above, a photographing start target region specified by a user in a desired manner is brought into focus (focal point and focal distance) in advance. In the case where a plurality of photographing start target regions are specified, the photographing start target region nearest to the center of the screen is automatically brought into focus. With this method, when a photographing target enters a specified photographing start target region and face recognition or the like is performed, focusing is quickly achieved, and photographing can be performed.

According to the embodiment described above, a desired subject (photographing target) can be reliably photographed at a position desired by a user in a captured image.

For example, by specifying a photographing start target region, a running object or person can be reliably brought into focus, and photographing can be performed. Alternatively, for example, by specifying a plurality of photographing start target regions, a group photograph in which individual people may move can be reliably taken.

[2. Others]

In this disclosure, in the case where the cellular phone terminal device 1 includes both the first camera unit 23 disposed on the rear side used for normal photographing and the second camera unit 24 disposed on the front side used for photographing the user who carries the cellular phone terminal device, the photographing methods described below may be used.

FIRST EXAMPLE

The second camera unit 24 captures an image of the face of a person as a photographing target and stores the face image in the memory unit 17. In the case where the image corresponds to a subject (photographing target) photographed by the first camera unit 23, photographing is performed.

(1-1) Select from Telephone Directory in which Photographing Target is Stored

A photographing target is selected from among face images stored in association with contact addresses in a telephone directory. When the face is recognized in a photographing start target region within an image captured by the first camera unit 23 or the second camera unit 24, photographing is performed. Accordingly, only when a specific face enters a photographing start target region, photographing can be performed.

(1-2) Recognize Image of Human Face Captured by Second Camera Unit 24

A face image as a photographing target is set on a camera-through image on the second camera unit 24. When the face is recognized in a photographing start target region in an image captured by the second camera unit 24 or the first camera unit 23, photographing is performed.

(1-3) User Selects Photographing Target from Among a Plurality of Faces Displayed on the Screen of Display Unit 14 at Camera Through of First Camera Unit 23

At camera through of the first camera unit 23, a user selects a photographing target from among a plurality of faces displayed on the screen. When the face is recognized in a photographing start target region in an image captured by the second camera unit 24, photographing is performed.

SECOND EXAMPLE

A photographing start target region is specified using the second camera unit 24, and recognition is performed by the first camera unit 23.

(2-1) A user sets, with the second camera unit 24, a photographing start target region, by using a finger of the user, tracking of the finger, taking a frame written on paper into an image, or the like. The result of the setting is displayed on the view-finder of the first camera unit 23. When an object or a face is recognized in the photographing start target region in an image captured by the first camera unit 23, photographing is performed.

(2-2) A photographing Start TRarget region is Set in Accordance with Movement of the Line of Sight Using a Line-Of-Sight Tracking Technique.

Furthermore, in the embodiment described above, by using positional information included in a GPS signal output from the GPS unit or together with the acceleration sensor and the gyro sensor, the movement amount and moving direction of the cellular phone terminal device may be calculated.

Furthermore, in the explanation of the embodiment described above, a cellular phone terminal device according to this disclosure is applied to a cellular phone terminal device having a camera function. However, this disclosure may be applied to an electronic apparatus having a camera function. For example, a cellular phone terminal device according to this disclosure may be applied to, for example, a PHS telephone set (PHS: Personal Handyphone System), a PDA device (PDA: Personal Digital Assistant), a portable game machine, and a notebook-type personal computer device. Furthermore, a cellular phone terminal device according to this disclosure may be applied to a still image pickup device (for example, a digital still camera), a moving image pickup device (digital video camera), and the like that capture an image of a subject using an imaging element. In any cases, advantages similar to those attained by the above-described embodiment can be achieved.

This disclosure may have configurations described below:

(1) An information processing apparatus comprising:
a camera unit that captures image data;
a display unit that displays the image data captured by the camera unit;
a control unit that sets a photographing target region specified at a desired position on a screen of the display unit, and instructs the camera unit to start photographing when a photographing target is detected in the photographing target region in the image data captured by the camera unit; and
a memory unit that stores an image captured by the camera unit after the instruction to start photographing.

(2) The information processing apparatus of (1), wherein
the photographing target region is a circular frame or a rectangular frame.

(3) The information processing apparatus of (1) or (2), further comprising:
a touch panel formed on, or integrally with the display unit, that receives a user input selecting the desired position of the photographing target region on the screen.

(4) The information processing apparatus of any of (1) to (3), further comprising:
a motion sensor that detects movement of the information processing apparatus.

(5) The information processing apparatus of (4), wherein
the control unit calculates a movement amount and movement direction of the information processing apparatus based on an output of the motion sensor.

(6) The information processing apparatus of (5), wherein
the control unit moves a position of the photographing target region on the screen in accordance with the movement amount and the movement direction.

(7) The information processing apparatus of (5), wherein
the control unit does not move a position of the photographing target region on the screen in accordance with the movement amount and the movement direction.

(8) The information processing apparatus of any of (1) to (7), wherein
the control unit calculates a size of the photographing target region after a zoom operation is performed based on a zoom factor of the camera unit.

(9) The information processing apparatus of (8), wherein
the control unit changes a size of the photographing target region on the screen based on the calculated size.

(10) The information processing apparatus of (6), wherein
the control unit calculates a size of the photographing target region after a zoom operation is performed based on a zoom factor of the camera unit.

(11) The information processing apparatus of (10), wherein
the control unit changes a size of the photographing target region on the screen based on the calculated size. (12) The information processing apparatus of any of (1) to (11), wherein
the photographing target region is set as a plurality of portions of the screen. (13) The information processing apparatus of (12), wherein
the control unit instructs the camera unit to start photographing when individual photographing targets are detected in all the plurality of photographing start target regions.

(14) The information processing apparatus of (12), wherein
the control unit instructs the camera unit to start photographing when a photographing target is detected in at least one of the plurality of photographing start target regions.

(15) The information processing apparatus of any of (1) to (14), wherein
the image data captured by the camera unit is not stored in the memory unit until the control unit instructs the camera unit to start photographing.

(16) The information processing apparatus of any of (1) to (15), further comprising:
a user interface that receives a user input identifying the photographing target.

(17) The information processing apparatus of any of (1) to (16), wherein
a control unit detects the photographing target in the photographing target region by continuously comparing image data in the photographing target region of the image data captured by the camera unit to a reference image corresponding to the photographing target.

(18) An information processing method performed by an information processing apparatus, the method comprising:
capturing image data by a camera unit;
displaying, by a display, the image data captured by the camera unit;
setting a photographing target region specified at a desired position on a screen of the display unit;
instructing the camera unit to start photographing when a photographing target is detected in the photographing target region in the image data captured by the camera unit; and
storing, by a memory, an image captured by the camera unit after the instruction to start photographing.

(19) A non-transitory computer-readable medium including computer-program instructions, which when executed by an information processing apparatus, cause the information processing apparatus to perform a process comprising:
capturing image data by a camera unit;
displaying the image data captured by the camera unit;
setting a photographing target region specified at a desired position on a screen of the display unit;
instructing the camera unit to start photographing when a photographing target is detected in the photographing target region in the image data captured by the camera unit; and
storing an image captured by the camera unit after the instruction to start photographing.

In the case where a series of processing in an embodiment described above are executed by software, the series of processing can be executed by a computer in which a program constituting the software is incorporated in dedicated hardware or a computer into which a program for implementing various functions is installed. For example, a program constituting desired software may be installed into a general-purpose personal computer or the like and executed. The above-described series of processing may be executed by hardware.

Furthermore, a recording medium on which program code of software implementing functions of an embodiment described above may be supplied to a system or an apparatus. In addition, it is obvious that the functions can also be implemented when a computer (or a control device such as a CPU or the like) of the system or the apparatus reads and executes the program code stored on the recording medium.

For example, a flexible disk, a hard disk, an optical disk, a magneto-optical disk, a CD-ROM, a CD-R, a magnetic tape, a nonvolatile memory card, a ROM, or the like may be used as the recording medium for supplying the program code in this case.

Furthermore, functions of an embodiment described above can be implemented when the computer executes the read program code. In addition, an OS or the like running on the computer performs part of or the entire actual processing on the basis of instructions of the program code. This also includes the case where functions of an embodiment described above are implemented by the processing.

Furthermore, in this specification, processing steps describing chronological processing may be performed in chronological order in accordance with the written order. The processing steps may be performed in parallel or independently (for example, parallel processing or processing by an object) without necessarily being performed in chronological order.

It should be understood by those skilled in the art that this disclosure is not limited to any of the embodiments described above and that various changes, combinations, and other embodiments may occur depending on the design or other factors insofar as they are within the scope of the claims or the equivalents thereof.

The invention claimed is:

1. An information processing apparatus comprising:
a camera unit that captures image data;
a display unit that displays the image data captured by the camera unit; and
circuitry configured to
control the display to display a menu identifying a plurality of photographing targets available for selection;
receive a first input selecting of at least one of the plurality of photographing targets;
receive a second input setting a photographing target region specified at a desired position on a screen of the display unit;
calculate a size of the photographing target region after a zoom operation is performed based on a zoom factor of the camera unit;
control changing a size of the photographing target region on the screen based on the calculated size;
controlling the camera unit to automatically start photographing without receiving another user input only when the at least one of the plurality of photographing targets is detected in the photographing target region in the image data captured by the camera unit; and
permanently store an image captured by the camera unit only after the camera unit is controlled to start photographing.

2. The information processing apparatus of claim 1, wherein
the photographing target region is a circular frame or a rectangular frame.

3. The information processing apparatus of claim 1, further comprising:
a touch panel formed on, or integrally with the display unit, that receives a user input selecting the desired position of the photographing target region on the screen.

4. The information processing apparatus of claim 1, further comprising:
a motion sensor that detects movement of the information processing apparatus.

5. The information processing apparatus of claim 4, wherein
the circuitry is configured to calculate a movement amount and movement direction of the information processing apparatus based on an output of the motion sensor.

6. The information processing apparatus of claim 5, wherein
the circuitry is configured to control moving a position of the photographing target region on the screen in accordance with the movement amount and the movement direction.

7. The information processing apparatus of claim 5, wherein
the circuitry is configured to control a position of the photographing target region to not move on the screen in accordance with the movement amount and the movement direction.

8. The information processing apparatus of claim 1, wherein
the photographing target region is set as a plurality of portions of the screen.

9. The information processing apparatus of claim 8, wherein
the circuitry is configured to control the camera unit to automatically start photographing only when individual photographing targets are detected in all the plurality of photographing start target regions.

10. The information processing apparatus of claim 8, wherein
the circuitry is configured to control the camera unit to automatically start photographing only when a photographing target is detected in at least one of the plurality of photographing start target regions.

11. The information processing apparatus of claim 1, wherein
the circuitry is configured to detect the photographing target in the photographing target region by continuously comparing image data in the photographing target region of the image data captured by the camera unit to a reference image corresponding to the photographing target.

12. An information processing method performed by an information processing apparatus, the method comprising:
capturing image data by a camera unit;
displaying, by a display, the image data captured by the camera unit;
controlling the display to display a menu identifying a plurality of photographing targets available for selection;
receiving a first input selecting of at least one of the plurality of photographing targets;
receiving a second input setting a photographing target region specified at a desired position on a screen of the display;
calculating a size of the photographing target region after a zoom operation is performed based on a zoom factor of the camera unit;
controlling changing a size of the photographing target region on the screen based on the calculated size;
controlling the camera unit to automatically start photographing without receiving another user input only when the at least one of the plurality of photographing targets is detected in the photographing target region in the image data captured by the camera unit; and
permanently storing, by a memory, an image captured by the camera unit only after the camera unit is controlled to start photographing.

13. A non-transitory computer-readable medium including computer-program instructions, which when executed by an information processing apparatus, cause the information processing apparatus to perform a process comprising:
capturing image data by a camera unit;
displaying the image data captured by the camera unit;
controlling a display to display a menu identifying a plurality of photographing targets available for selection;
receiving a first input selecting of at least one of the plurality of photographing targets;

receiving a second input setting a photographing target region specified at a desired position on a screen of the display;
calculating a size of the photographing target region after a zoom operation is performed based on a zoom factor of the camera unit;
controlling changing a size of the photographing target region on the screen based on the calculated size;
controlling the camera unit to automatically start photographing without receiving another user input only when the at least one of the plurality of photographing targets is detected in the photographing target region in the image data captured by the camera unit; and
permanently storing an image captured by the camera unit only after the camera unit is controlled to start photographing.

\* \* \* \* \*